(12) United States Patent
Shrum, Jr. et al.

(10) Patent No.: US 8,826,312 B2
(45) Date of Patent: Sep. 2, 2014

(54) BROADCAST REMOTE CONTROL

(75) Inventors: Edgar V. Shrum, Jr., Smyrna, GA (US); Michael Joseph McCarthy, Marietta, GA (US); Francisco Gonzalez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 165 days.

(21) Appl. No.: 12/767,652

(22) Filed: Apr. 26, 2010

(65) Prior Publication Data

US 2011/0265111 A1 Oct. 27, 2011

(51) Int. Cl.
| | |
|---|---|
| *H04H 60/32* | (2008.01) |
| *H04H 60/43* | (2008.01) |
| *H04N 21/442* | (2011.01) |
| *H04N 21/422* | (2011.01) |
| *H04H 60/44* | (2008.01) |
| *H04N 21/222* | (2011.01) |
| *H04N 21/258* | (2011.01) |
| *H04N 21/45* | (2011.01) |
| *H04N 21/466* | (2011.01) |
| *H04N 21/658* | (2011.01) |

(52) U.S. Cl.
CPC ......... *H04H 60/43* (2013.01); *H04N 21/44213* (2013.01); *H04N 21/42204* (2013.01); *H04H 60/44* (2013.01); *H04N 21/2221* (2013.01); *H04N 21/25891* (2013.01); *H04N 21/44218* (2013.01); *H04N 21/44222* (2013.01); *H04N 21/4508* (2013.01); *H04N 21/4667* (2013.01); *H04N 21/6582* (2013.01)
USPC ......... 725/14; 725/9; 725/12; 725/20; 725/34

(58) Field of Classification Search
CPC .......... H04N 21/44222; H04N 21/42204; H04N 21/44213
USPC ................ 725/9, 12, 14, 20, 34, 21
See application file for complete search history.

(56) References Cited

U.S. PATENT DOCUMENTS

| | | | | |
|---|---|---|---|---|
| 5,235,414 | A  * | 8/1993 | Cohen | 725/13 |
| 5,382,970 | A  * | 1/1995 | Kiefl | 455/2.01 |
| 5,483,276 | A  * | 1/1996 | Brooks et al. | 725/10 |
| 6,160,796 | A  * | 12/2000 | Zou | 370/257 |
| 7,117,518 | B1 * | 10/2006 | Takahashi et al. | 725/86 |
| 7,584,484 | B2 * | 9/2009 | Headley et al. | 725/19 |
| 2002/0152461 | A1 * | 10/2002 | Istvan | 725/32 |
| 2003/0005430 | A1 * | 1/2003 | Kolessar | 725/9 |
| 2005/0203798 | A1 * | 9/2005 | Jensen et al. | 705/14 |
| 2006/0089118 | A1 * | 4/2006 | Whitehouse | 455/352 |
| 2007/0157281 | A1 * | 7/2007 | Ellis et al. | 725/134 |
| 2008/0127253 | A1 * | 5/2008 | Zhang et al. | 725/35 |
| 2008/0201731 | A1 * | 8/2008 | Howcroft | 725/13 |
| 2008/0244637 | A1 * | 10/2008 | Candelore | 725/28 |
| 2009/0046205 | A1 * | 2/2009 | Strasser et al. | 348/634 |
| 2009/0122131 | A1 * | 5/2009 | Mears | 348/14.04 |
| 2009/0307732 | A1 * | 12/2009 | Cohen et al. | 725/87 |
| 2010/0061661 | A1 * | 3/2010 | Kamimaeda et al. | 382/298 |
| 2011/0099263 | A1 * | 4/2011 | Patil et al. | 709/224 |
| 2012/0011528 | A1 * | 1/2012 | Nielsen et al. | 725/12 |

* cited by examiner

*Primary Examiner* — Pankaj Kumar
*Assistant Examiner* — Sahar Baig
(74) *Attorney, Agent, or Firm* — Merchant & Gould

(57) ABSTRACT

Identifying user behaviors via remote control signal broadcasts may be provided. A content element such as a video may be displayed on a display device. During display of the content, a control signal may be received and deciphered. The deciphered control signal may be used to determine whether the content is being consumed by a user, and this determination may be logged and/or reported to the content provider.

20 Claims, 5 Drawing Sheets

BROADCAST REMOTE CONTROL

BACKGROUND

Broadcast remote control is a process for collecting user behavior information. In some situations, a television service provider can determine that a particular channel is being consumed by a television but not whether a user is actually watching the channel programming. For example, the television may have been left on while the user was out of the room or the programming may have been muted. This causes problems for the provider as advertisers are seeking greater information regarding whether users are actually viewing commercials placed in a programming stream.

SUMMARY

Consistent with embodiments of the present invention, systems and methods are disclosed for remote control broadcast detection. Identifying user behaviors via remote control signal broadcasts may be provided. A content element such as a video may be displayed on a display device. During display of the content, a control signal may be received and deciphered. The deciphered control signal may be used to determine whether the content is being consumed by a user, and this determination may be logged and/or reported to the content provider.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

Figure 1:
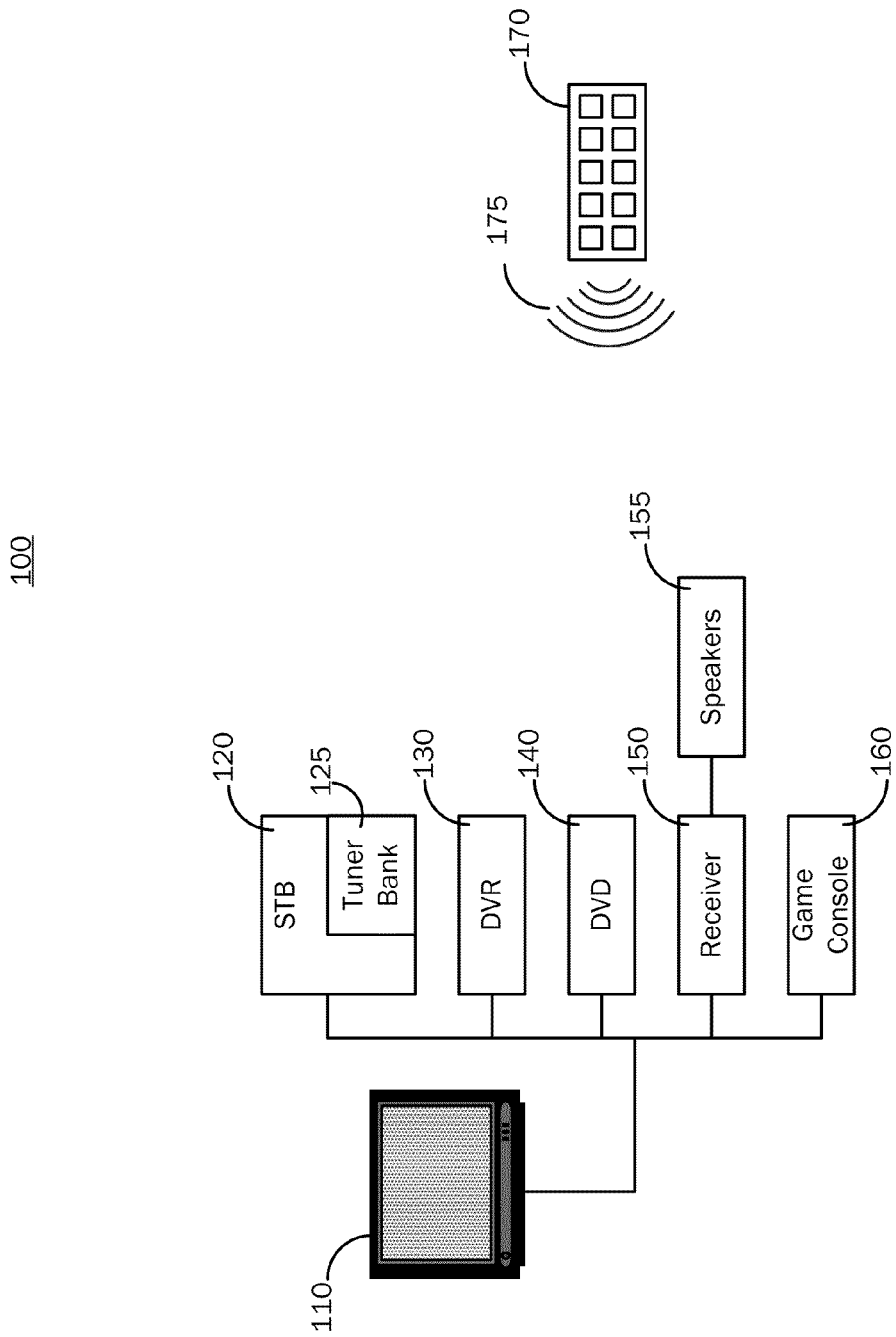
FIG. 1 is a block diagram illustrating a customer premises architecture.

Embodiments of the present invention provide for methods and systems for identifying user behaviors via remote control signal broadcasts. Remote control devices associated with various video system components such as cable boxes, televisions, video recorders, etc., broadcast their control signals within the viewing environment. Devices other than the intended device may receive these control signals and may infer activity on the part of the user. For example, a "volume up" control signal intended for a receiver may be detected by a set-top box (STB). The receipt of these control signals may be used to determine the presence of a viewer and/or what activities the user is engaged in. For example, reporting data from a STB may report that a tuner was on a particular channel and that a viewer was actually present at the times that remote control signals are received. Further, the actual remote control codes may be deciphered to indicate the actual activity. For example, a remote control signal comprising code 1122345 may be received and deciphered as a volume up control request for a Sony® television. The deciphered activity may also be used to determine that a video content element was not being consumed. For example, it may be detected that the user was engaged with his/her game console; while the STB tuner was set to a given channel, the user was actually not watching the content of the channel to which the STB was tuned.

The user activity may also be used to determine how multimedia content from a cable operator's network is being consumed. For example, the activity may be used to determine what type of viewing device a user uses to view content, whether the user is using a stereo or surround sound system for audio consumption, and/or what other activities the user (or household) engages in (e.g., DVD viewing, gaming) and when these activities occur. For another example, consumption of a competitor's content stream may be detected (e.g., use of a network based movie delivery system rather than the cable operator's on demand and/or pay per view services). This detection may be used to determine that the user may not be watching the content of the channel to which the STB is tuned and the identification of this user behavior may trigger business logic for providing marketing information relating to the cable provider's own services.

The activity may also be used to determine when shared resources are no longer being consumed by the user and may be released for other users/applications. For example, a home may have a video tuner bank that is shared across multiple tuner-less STBs in the home. In such a case, there may be more STBs or possible recording sessions than tuners available (oversubscription). Sensing of remote control activity may be used to determine if a tuner's state is stale. That is, if no user activity (direct tuner or indirect remote control) is detected for more than a configurable time threshold (e.g., 60 minutes), a resource control application may infer that no one is actually viewing the content from the tuner and release the resource to be used by another device or application. According to an embodiment, upon detection of inactivity, a message may be displayed asking for user verification. If verified by lack of acknowledgement by a user, the resource may be released.

In describing embodiments herein, a cable television services system will often be used as an example. However, those skilled in the art will recognize that embodiments of the invention are not meant to be limited to cable television systems, but may include other types of video delivery networks. For example, fiber and/or satellite based content delivery systems may also be used with embodiments of the invention.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is simplified block diagram illustrating an operating environment 100 for identifying user behaviors via remote control signal broadcasts. Operating environment 100 may comprise a video display 110, such as a television, a video projector, and/or a computer display. Video display 110 may be coupled to a plurality of components such as a set-top box (STB) 120 for receiving and/or decoding cable television signals, a digital video recorder (DVR) 130, a DVD player 140, a sound receiver 150 such as a stereo and/or surround sound system coupled to a plurality of speakers 155, and a game console 160. STB 120 may comprise a tuner bank 125 that may comprise a plurality of video signal tuners, each operative to decode an encoded video signal received from a content provider. According to embodiments, receiver 150 may be a multi-wavelength receiver, a multi-frequency receiver, a multi-protocol IR receiver, a multi-protocol decoder, or a USB or WiFi radio receiver. Each of the plurality of components may be operative to provide audio and/or video signals to video display 110. Operating environment 100 may further comprise at least one remote control 170 operative to broadcast a control signal 175 to at least one of the plurality of components. Each component may be associated with a different remote control (not shown) and/or remote control 170 may be operative to broadcast control signals associated with any and/or all of the components. For example, a game controller associated with game console 160 may be operative to broadcast control signals for playing a game and adjusting the volume output of receiver 150. Similarly, a universal remote control may be programmed to control playback of a disc associated with DVD player 140 and to control channel changes associated with STB 120. Control signal 175 may comprise, for example, a wireless network signal, a Bluetooth signal, an infrared (IR) signal, and/or a radio frequency (RF) signal.

The protocols used to transmit control signal 175 from remote control 170 to a component may vary by vendor (e.g., Sony, Panasonic, Motorola, etc.). IR receivers may typical work in two frequency bands while RF receivers may be programmed to operate in a single band. Bluetooth uses a radio technology called frequency-hopping spread spectrum, which divides the data being sent and transmits chunks of it on up to 79 frequencies. A receiving component (e.g., STB 120) may sample the incoming signals and may use a pattern matching algorithm to determine the protocol so the codes can be extracted. A data table comprising known vendor codes may be stored in a memory storage associated with the receiving component.

Figure 2:
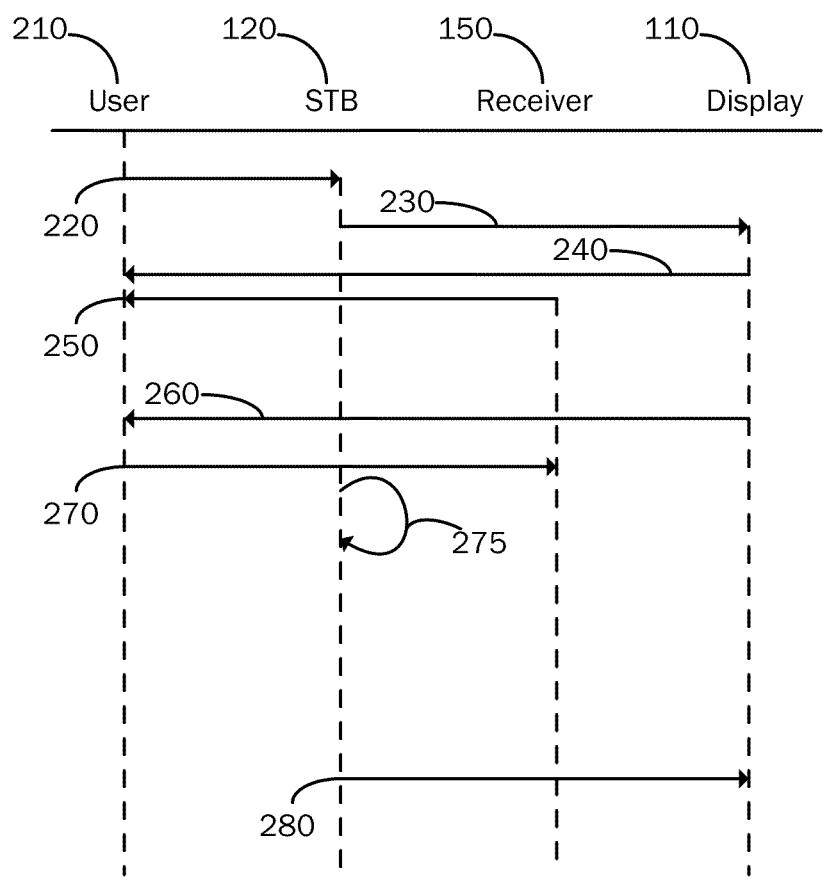
FIG. 2 is a Sequence-Interaction diagram.

FIG. 2 is a timing diagram of a user 210 interaction with components of operating environment 100 such as STB 120, receiver 150, and display 110. At stage 220, user 210 may select an element of video content to view, such as by tuning to a cable channel via STB 120. STB 120 may then tune to the selected channel and output the video to display 110 at stage 230. Display 110 may output the video to a screen for consumption by user 210 at stage 240 and/or receiver 150 may begin to output associated audio for consumption by user 210 at stage 250. At stage 260, the tuned cable channel may begin to display a second portion of the video content, such as an advertisement spliced into the video stream using digital program insertion. During the time period in which the second portion of the video content is displayed on display 110, user 210 may use a remote control to send a signal to one of the components at stage 270, such as a volume change request to receiver 150. The volume change request may comprise broadcast control signal 175 and may be detected by STB 120 at stage 275. STB 120 may decipher control signal 175 as a volume change request for receiver 150 and may store the event and the time associated with the volume change request in a memory associated with STB 120. Some time after the volume change request is received in stage 270, STB 120 may determine, at stage 280 that no input has been received from user 210 for a time greater than a threshold time (e.g., 60 minutes) and STB 120 may cease outputting the video content to display 110.

Figure 3:
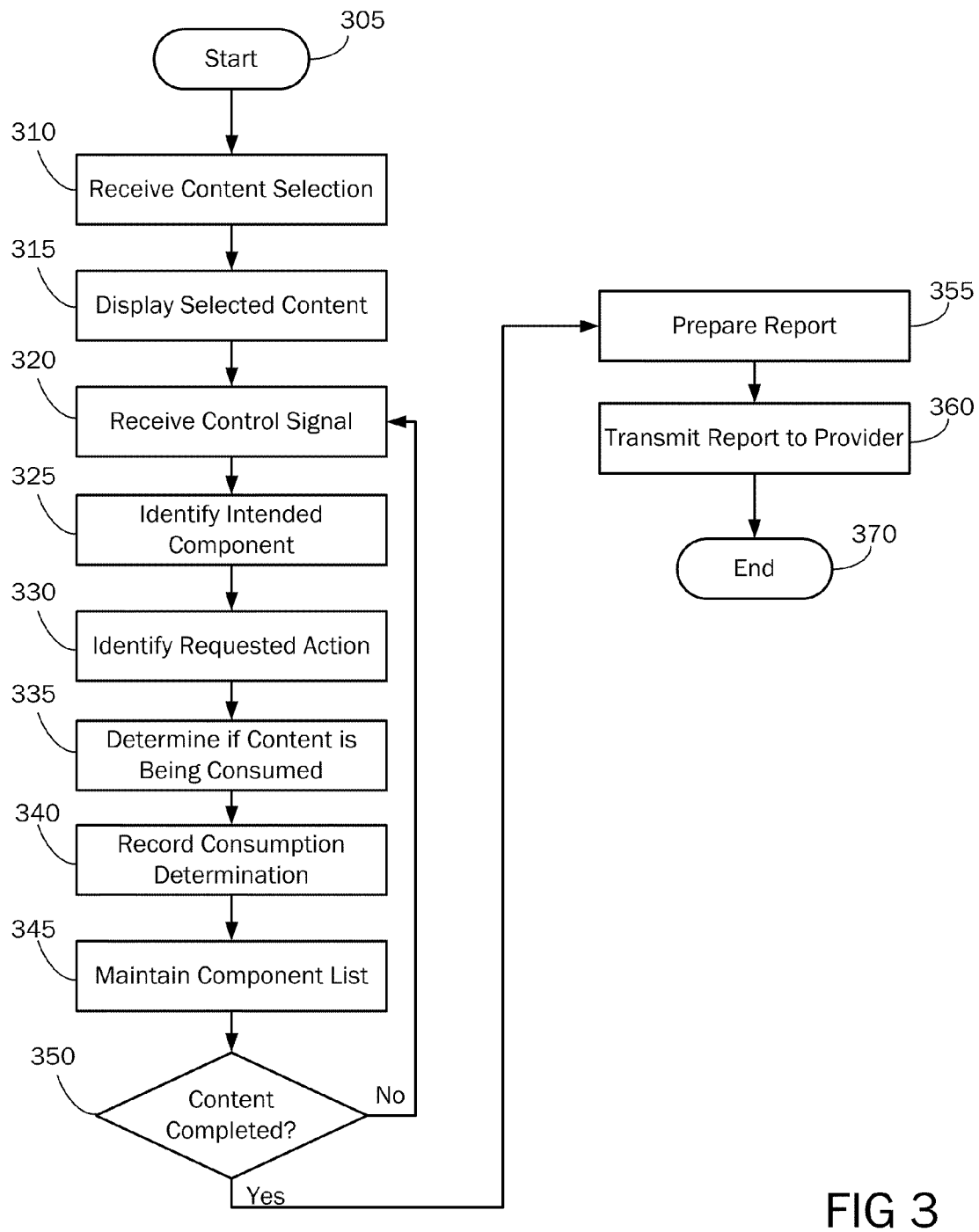
FIG. 3 is a flow chart showing an illustrative routine for providing side loading.

FIG. 3 is a flow chart of a method 300 for identifying user behavior from remote control broadcasts. Method 300 may be implemented using a computing device 500 as described in more detail below with respect to FIG. 5. Ways to implement the stages of method 300 will be described in greater detail below. Method 300 may begin at starting block 305 and proceed to stage 310 where computing device 500 receive a content selection. For example, STB 120 may receive a request from remote control 170 to tune to a selected program channel.

Method 300 may then advance to stage 315 where computing device 500 may display the selected content. For example, STB 120 may output the selected program channel to display 110. STB 120 may also be operative to output audio associated with the selected content to speakers 155 via receiver 150.

From stage 315, method 300 may advance to stage 320 where computing device 500 may receive a control signal. For example, STB 120 may receive a channel change request, DVR 130 may receive a pause and/or record request, and/or receiver 150 may receive a mute and/or volume change request via control signal 175 from remote control 170. Components for which the signal is not intended may be able to receive the broadcast of control signal 175, such as via IR, RF, or Bluetooth. For example, STB 120 may receive a channel change request broadcast by remote control 170 and intended for receiver 150.

Method 300 may then advance to stage 325 where computing device 500 may identify the intended component. For example, STB 120 may decipher a code associated with control signal 175 indicating that receiver 150 is the intended recipient of control signal 175. Consistent with embodiments of the invention, STB 120 may be further operable to decipher the signal to determine a brand and/or model associated with receiver 150. If STB 120 is unable and/or not configured to decipher control signal 175, the code may be transmitted to a central data store for later deciphering and/or analysis. STB 120 may buffer a plurality of detected unknown control signals and transmit them in periodic batches for analysis.

From stage 325, method 300 may advance to stage 330 where computing device 500 may identify a requested action associated with the received signal. For example, computing device 500 may be operable to decode the messages that are being transmitted. From those messages, computing device 500 may discern, based on an understanding of what the codes are and what message is being sent, that control signal 175 comprises, a volume signal for a surround sound system such as receiver 150, or that control signal 175 comprises a command for DVD player 140.

Method 300 may then advance to stage 335, where computing device 500 may determine if the selected content is being consumed. For example, STB 120 may receive control signal 175 and determine that control signal 175 is not intended for STB 120. Even if STB 120 does not decipher an intended component and/or requested command from control signal 175, STB 120 may determine that a user is present in the room and consuming the selected content. If STB 120 does decipher control signal 175, additional logic may be applied to the determination. For example, a volume up request may be determined to be consistent with user consumption of the content, while a DVD player operation request (e.g., play, fast-forward, rewind, scene skip, menu operation, etc.) may be determined to be inconsistent with user consumption of the content. That is, a request to change the volume may indicate that the user is consuming the content at the time the control signal is sent and is using receiver 150 to listen to the sound associated with the content. If a DVD player signal is received, that may imply that the user has switched input and while they may be in the room, they're no longer consuming the content.

Method 300 may then advance to stage 340 where the determination of whether the user is consuming the content may be recorded. For example, STB 120 may create an event log entry in a memory storage associated with STB 120. Additional information may be associated with the record, such as the identified component, the identified command, a timestamp of when control signal 175 was received, and a time within the selected content (e.g., during display of a given portion of the content and/or at a given time relative to the content duration) when control signal 175 was received. Presence information, as described above, may be recorded and associated with the consumption determination.

Consistent with embodiments of the invention, computing device 500 may record consumption determinations associated with portions of the selected content. For example, a selected cable television channel may comprise insertion markers that may identify when an inserted commercial and/or program break begins and/or ends. STB 120 may identify these markers and begin logging consumption determination only during the inserted material in order to evaluate whether the user is actually consuming the inserted material.

Further consistent with embodiments of the invention, commands received within a time threshold before and/or after the content portion in question may be extrapolated to provide consumption determinations with respect to the content portion. For example, a volume increase request 30 seconds before the content portion may be extrapolated to a determination that the content is being consumed before, during, and/or after the content portion, while a mute request just before and/or shortly after the content portion begins and an un-mute request after the content portion ends may be extrapolated to a determination that the content is not being consumed. Similarly, if control signal 175 is received and deciphered to be a playback control associated with DVD player 150 several minutes before the content portion begins, a determination may be made that a content selection being provided by STB 120 is not being consumed at least until another control signal is received.

From stage 340, method 300 may advance to stage 345 where computing device 500 may maintain a list of identified components. For example, STB 120 may maintain a list in a memory storage associated with STB 120. STB 120 may determine whether the component identified in stage 325 has been previously identified and exists on the list. If not, STB 120 may add an entry associated with the identified component to the list. If the identified component does exist on the list, STB 120 may update a "last seen" entry associated with the component. As STB 120 learns what components are in the user's environment and what devices are being used to consume content, it may develop additional usage information. For example, STB 120 may record activity information associated with the other components, such as titles selected and time spent watching movies on DVD player 140, shows and other content recorded on DVR 130, and/or games played on game console 160.

From stage 345, computing device 500 may determine whether the selected content has completed displaying. For example, STB 120 may determine whether a program being displayed on a selected cable channel has reached its end. If not, method 300 may return to stage 320.

Otherwise, method 300 may advance to stage 355 where computing device 500 may prepare a report. For example, STB 120 may prepare a report that the user consumed the entirety of the selected content or that the user turned off display 110 halfway through and so did not consume the latter half of the content. The report may comprise information about the selected content such as a title, performers, whether the content was live, pre-recorded, on-demand programming, or pay-per-view content. The report may also comprise user behavior information, such as whether the user adjusted the volume, interacted with other devices, and/or sent no control signals for the duration of the content. According to another embodiment, a report may be generated periodically based on a predetermined condition, such as a time.

Method 300 may then advance to stage 360 where computing device 500 may transmit the report to a content provider. For example, STB 120 may send the report to a headend associated with a cable provider. The provider may receive user behavior reports associated with content provided by other providers. For example, a cable provider associated with STB 120 may receive a report associated with a user's consumption of a video displayed by DVD player 140. The report may be associated with other content portions associated with the selected content, such as advertising consumption data and/or may track user behavior regarding the selected content itself, such as whether a user used surround sound to listen to audio associated with the selected content. Method 300 may then end at stage 370.

Figure 4:
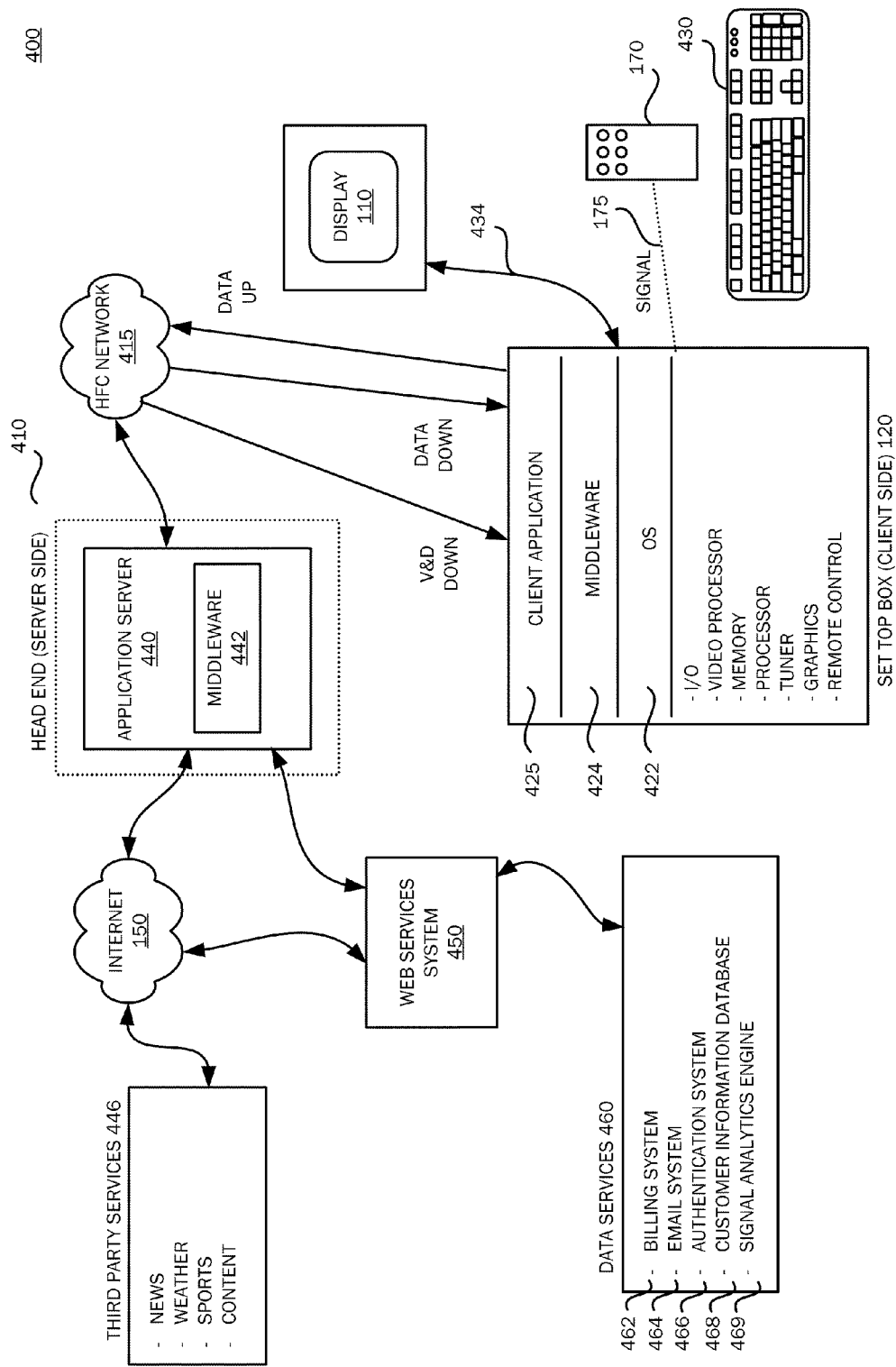
FIG. 4 is a block diagram of a cable television system.

FIG. 4 is a block diagram of a cable television (CATV) system 400 that may serve as an environment for embodiments of the present invention. Generally described, the CATV 400 provides digital and/or analog video programming, information content and interactive television services. These services may be transmitted via a hybrid fiber coax (HFC) network 415 to display 110 for consumption by a cable television/services system customer. For example, display 110 may be located at a customer premises. HFC network 415 may combine both optical fiber and coaxial cable lines. Typically, optical fiber runs from a cable head end 410 to neighborhoods of 500 to 2,000 customers. Coaxial cable runs from the optical fiber feeders to each customer. According to embodiments of the present invention, the functionality of HFC network 415 allows for efficient bidirectional data flow between a client-side set-top box 120 and a server-side application server 440 of the present invention.

CATV system 400 may comprise a distributed client-server computing system for providing video and data flow across HFC network 415 between server-side services providers (e.g., cable television/services providers) via head end 410 and a client-side customer via client-side set-top box (STB) 120 functionally connected to a customer receiving device, such as television set 420. CATV systems 400 may provide a variety of services across HFC network 415 including traditional digital and analog video programming, telephone services, high speed Internet access, video-on-demand, and information services.

On the client side of CATV system 400, digital and analog video programming and digital and analog data may be provided to display 110 via set-top box (STB) 120. Interactive television services that allow a customer to input data to CATV system 400 may likewise be provided by STB 120. As illustrated in FIG. 4, STB 120 may comprise a multipurpose computing device having a computer processor, memory and an input/output mechanism. The input/output mechanism may receive input from server-side processes via HFC network 415 and from customers via input devices such as remote control 170 and a keyboard 430. Remote control 170 and keyboard 430 may communicate with the STB 120 via a suitable communication transport such as an infrared connection comprising control signal 175. STB 120 may also include a video processor for processing and providing digital and analog video signaling to display 110 via a cable communication transport 434. A multi-channel tuner may be provided for processing video and data to and from STB 120 and head end 410.

STB 120 may also include an operating system 422 for directing the functions of STB 120 in conjunction with a variety of client applications. For example, if a client application 425 requires a news flash from a third-party news source to be displayed on display 110, operating system 422 may cause the graphics functionality and video processor of STB 120, for example, to output the news flash to display 110 at the direction of client application 425 responsible for displaying news items.

Because a variety of different operating systems 422 may be utilized by a variety of different brands and types of set-top boxes, a middleware layer 424 may be provided to allow a given software application to be executed by a variety of different operating systems. According to an embodiment of the present invention, middleware layer 424 may include a set of application programming interfaces (API) that are exposed to client application 425 and operating system 422 that allow client application 425 to communicate with operating system 422 through common data calls understood via the API set. As described below, a corresponding middleware layer may be included on the server side of CATV system 400 for facilitating communication between server-side application server 440 and client-side STB 120. A middleware layer 442 of server-side application server 440 and middleware layer 424 of client-side STB 120 may format data passed between the client side and server side according to the Extensible Markup Language (XML). As should be appreciated, XML is only one example of data formatting, data passed between the client side and the server side may be formatted according to any other suitable formatting language or standard.

According to one embodiment, the set-top box 120 passes digital and analog video and data signaling to the television 110 via a one-way communication transport 134. STB 120 may pass digital and analog video and data signaling to the display 110 via communication transport 434. According to an embodiment, bidirectional communication may be accomplished between the STB 120 and the television 110. For example, high-definition multimedia interface (HDMI) ports on the STB 120 and television 110 allow for bidirectional data communications between the devices. STB 120 may receive video and data from the server side of CATV system 400 via HFC network 415 through a video/data downlink and data via a data downlink. STB 120 may transmit data from the client side of CATV system 400 to the server side of CATV system 400 via HFC network 415 via one data uplink. The video/data downlink may comprise an "in band" downlink that allows for digital and analog video and data signaling from the server side of CATV system 400 through HFC network 415 to set-top box 120 for use by STB 120 and for distribution to television set 420. The "in band" signaling space may operate at a variety of frequencies. According to one embodiment, the "in band" signaling space may operate at a frequency between 54 and 1000 megahertz. The signaling space is generally divided into 6 megahertz channels in which may be transmitted a single analog signal or a greater number (e.g., up to ten) digital signals.

The data downlink and the data uplink, illustrated in FIG. 4, between HFC network 415 and set-top box 120 may comprise "out of band" data links. The "out of band" frequency range generally lies between zero and 54 megahertz. Data flow between client-side set-top box 120 and server-side application server 440 is typically passed through the "out of band" data links. Alternatively, an "in band" data carousel may be positioned in an "in band" channel into which a data feed may be processed from server-side application server 440 through HFC network 415 to client-side STB 120. Operation of data transport between components of CATV system 400, described with reference to FIG. 4, is well known to those skilled in the art.

Data passed between CATV system 400 backend components such as head end 410 and CATV system 400 front end components such as STB 120 may be passed according to the Data Over Cable Service Interface Specification (DOCSIS). DOCSIS provides for a mechanism for data transport over a cable system such as CATV 400, illustrated in FIG. 4. Among other things, DOCSIS allows for the passing of digital communications and Internet connectivity over HFC network 415.

Referring still to FIG. 4, head end 410 of the CATV system 400 may be positioned on the server side of CATV system 400 and may include hardware and software systems responsible for originating and managing content for distributing through HFC network 415 to client-side STB 120 for presentation to customers via display 110. As described above, a number of services may be provided by CATV system 400, including digital and analog video programming, interactive television services, telephone services, video-on-demand services, targeted advertising, and provision of information content.

Application server 440 may comprise a general-purpose computing system operative to assemble and manage data sent to and received from client-side set-top box 120 via HFC network 415. As described above with reference to set-top box 120, application server 440 may comprise middleware layer 442 for processing and preparing data from head end 410 of CATV system 400 for receipt and use by client-side set-top box 120. For example, application server 440 via the middleware layer 442 may obtain data from one and/or more of a plurality of third-party services 446 via network 150 for transmitting to a customer through HFC network 415 and set-top box 120. For example, a weather report from a third-party weather service may be downloaded by application server 440 via network 150. When application server 440 receives the downloaded weather report, middleware layer 442 may be utilized to format the weather report for receipt and use by set-top box 120. Data obtained and managed by middleware layer 442 of application server 440 may be formatted according to the Extensible Markup Language and may be passed to set-top box 120 through HFC network 415 where the XML-formatted data may be utilized by client application 425 in concert with middleware layer 424, as described above. A variety of third-party services 446 data, including news data, weather data, sports data and other information content may be obtained by application server 440 via distributed computing environments such as network 150 for provision to customers via HFC network 415 and set-top box 120.

According to embodiments of the present invention, the application server 440 may obtains customer profile data from services provider data services 460 (which may comprise an implementation of profile server 135) for preparing a customer profile that may be utilized by the set-top box 120 for tailoring certain content provided to the customer. According to embodiments of the present invention, a customer profile may include communications applications provisioned on networked STBs, as well as, designations of individual STBs in a home, business or facility (e.g., "kitchen STB," "bedroom STB," "office STB," and the like).

A plurality of provider data services 460 may include a number of services operated by the services provider of CATV system 400 that may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. A customer information database 468 may include general information about customers such as place of employment, business address, business telephone number and demographic information such as age, gender, educational level, and the like. A signal analytics engine 469 may be operative to receive detected control signals, such as control signal 175, and may decipher and/or analyze associated codes. As should be understood by those skilled in the art, the disparate data services systems 462, 464, 466, 468, and 469 are illustrated as a collection of data services for purposes of example only. The example data services systems comprising data services 460 may operate as separate data services systems, which communicate with a web services system (described below) along a number of different communication paths and according to a number of different communication protocols.

Referring still to FIG. 4, a web services system 450 is illustrated between application server 440 and data services 460. Web services system 450 may serve as a collection point for data requested from each of the disparate data services systems comprising data services 460. When application server 440 requires customer profile data from one or more of data services 460 for preparation or update of a customer profile, application server 440 passes a data query to web services system 450. Web services system 450 formulates a data query to each of the available data services systems for obtaining any available data for a given customer as identified by a set-top box identification associated with the customer. Web services system 450 may serve as an abstraction layer between the various data services systems and application server 440. That is, application server 440 is not required to communicate with the disparate data services systems, nor is application server 440 required to understand the data structures or data types utilized by the disparate data services systems. Web services system 450 may be operative to communicate with each of the disparate data services systems for obtaining necessary customer profile data. The customer profile data obtained by the web services system is assembled and is returned to application server 440 for ultimate processing via middleware layer 442, as described above.

An embodiment consistent with the invention may comprise a system for detecting user behavior. The system may comprise a memory storage and a processing unit coupled to the memory storage. The processing unit may be operative to select a video content element to display, determine whether a control signal has been transmitted, determine whether, according to the control signal, the video content element is being consumed by a user, and record the determination of whether the video content element is being consumed by the user. The control signal may be intended for one component (e.g. a stereo receiver) and received both by the intended component and by another component (e.g. a set-top box) comprising the system. Consistent with embodiments of the invention, determining whether the video content element is being consumed by a user may comprise determining whether the at least one control signal is associated with modifying the display of the video content element. For example, the control signal may comprise a volume change request for a surround sound system associated with outputting audio associated with the video content element.

Another embodiment consistent with the invention may comprise a system for identifying user behavior. The system may comprise control signal receiver, a memory storage, and a processing unit coupled to the control signal receiver and the memory storage. The processing unit may be operative to receive a selection of a video content element, output the selected video content element to a display device, receive a control signal via the control signal receiver, and create an event log item in the memory storage associated with the receipt of the control signal comprising and the video content element. The processing unit may be further operative to identify an insertion tag associated with the video content element, determine whether the control signal is received during an advertisement section of the video content, and skip creating the event log item if the control signal is not received during the advertisement section.

Yet another embodiment consistent with the invention may comprise a system for identifying a user presence during a content display. The system may comprise a memory storage and a processing unit coupled to the memory storage. The processing unit may be operative to display a video on a display device, receive, during display of the video, a control signal from a remote control, decipher a code associated with the at least one control signal, determine, according to the at least one control signal, whether the video is being consumed by a user, and log the determination of whether the video is being consumed by the user.

Figure 5:
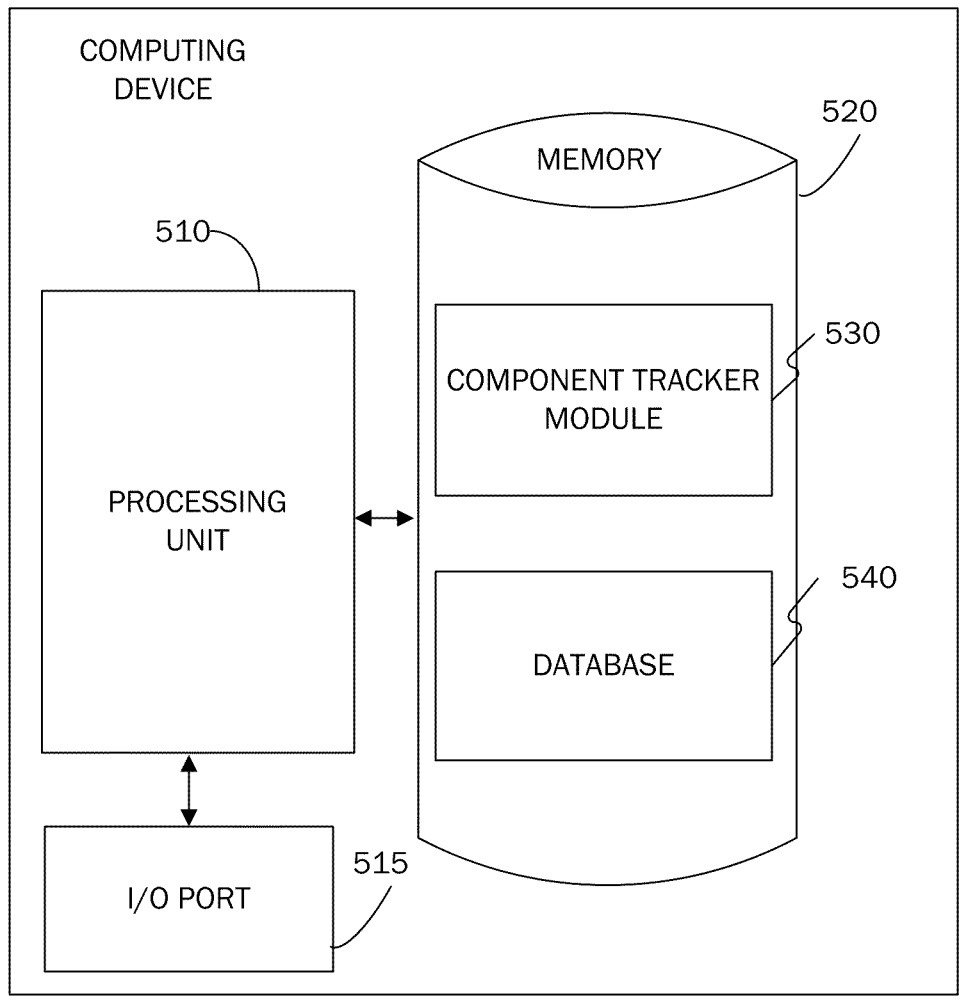
FIG. 5 is a block diagram of a computing device.

FIG. 5 illustrates a computing device 500 as configured to execute component tracker software module 530. Computing device 500 may include a processing unit 510, an input/output port 515, and a memory unit 520. Input/output port 515 may comprise, for example a signal receiver such as an IR port for receiving control signal 175 from remote control 170. Memory 520 may include a component tracker software module 530 and a database 540. While executing on processing unit 510, component tracker software module 530 may perform processes for deciphering control signals, identifying components, and/or maintaining a component list including, for example, one or more stages included in method 300 described above with respect to FIG. 3. Furthermore, component tracker software module 530 may be executed on or reside in any element shown and/or described with respect to FIG. 1. Moreover, any one or more of the stages included in method 300 may be performed on any element shown in FIG. 1.

Computing device 500 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

As described herein, methods and systems are provided for allowing a user of a wireless communication device or other suitable communication device to receive and review transcribed voicemail messages in text format and for allowing the user to access associated audio versions of transcribed voicemail messages without the need for accessing a voicemail system to cycle through various prompts and stored voicemail messages. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of detecting user behavior, the method comprising:
maintaining a list of components;
receiving, at a computing device, at least one content element to display;
outputting, from the computing device, the at least one content element to a display device;
determining, while the at least one content element is being displayed, whether at least one control signal has been received at the computing device;
in response to determining that the at least one control signal has been received at the computing device, determining whether, according to the at least one control signal, the at least one content element is content provided by a content provider, or content provided by another component being consumed by a user;
if the component is not on the list of components, adding the component to the list of components;
updating the list of components to include information about the usage of the component; and
recording, at the computing device, activity information associated with the at least one content element being consumed by the user.

2. The method of claim 1, wherein the at least one control signal comprises at least one of the following: an infrared transmission, a radio frequency transmission, a Bluetooth transmission, and a wireless network transmission.

3. The method of claim 1, wherein the at least one control signal comprises a control code associated with a first component and wherein the at least one control signal is received and decoded by at least one second component.

4. The method of claim 3, wherein the at least one second component records transmissions of the control signal.

5. The method of claim 3, further comprising: identifying, by the at least one second component, at least one of the following: a model and a brand associated with the first component.

6. The method of claim 5, further comprising: maintaining the list of components associated with a plurality of received control signals.

7. The method of claim 3, further comprising:
identifying, by the at least one second component, a command associated with the at least one control signal; and
determining whether the at least one content element is being consumed by the user according to the command associated with the at least one control signal.

8. The method of claim 1, wherein determining whether, according to the at least one control signal, the at least one content element is content provided by the content provider, or content provided by another component being consumed by the user comprises determining whether the at least one control signal is associated with modifying the display of the content element.

9. A system for identifying user behavior, the system comprising:
a control signal receiver;
a memory storage; and
a processing unit coupled to the control signal receiver and the memory storage, wherein the processing unit is operative to:
maintain a list of components;
receive a selection of a content element;
output the selected content element to a display device;
receive a control signal via the control signal receiver;
determine whether the control signal relates to content provided by a content provider, or content provided by another component;
if the component is not on the list of components, create an event log item in the memory storage associated with the receipt of the control signal that relates to content provided by another component;
update the list of components to include information about the usage of the component; and
record activity information associated with the content element being consumed by the user.

10. The system of claim 9, wherein the control signal is received from a remote control associated with the system.

11. The system of claim 9, wherein the control signal is received from a remote control associated with a media component coupled to the system.

12. The system of claim 9, wherein the processing unit is further operative to decipher a requested action associated with the control signal.

13. The system of claim 12, wherein the event log item further comprises the requested action deciphered from the control signal.

14. The system of claim 9, wherein the processing unit is further operative to:
identify an insertion tag associated with the content element, wherein the insertion tag is operative to signal an advertisement section of the content element;
determine whether the control signal is received during the advertisement section of the content element; and
in response to determining that the control signal is not received during the advertisement section of the content element, skip creating the event log item.

15. The system of claim 9, wherein the processing unit is further operative to:
produce a report of user activity associated with the content element derived from the event log item; and
transmit the report to the content provider of the content element.

16. A method for identifying a user presence during a content display, the method comprising:
maintaining a list of components;
outputting, from a computing device, a content on a display device;
receiving, at the computing device, during display of video, at least one control signal from a remote control;
deciphering a code associated with the at least one control signal;
determining, from the computing device, according to the at least one control signal, whether the at least one control signal relates to content provided by a content provider, or content provided by another component that is being consumed by a user;
if the component is not on the list of components, adding the component to the list of components;
updating the list of components to include information about the usage of the component; and
logging activity information associated with the content being consumed by the user.

17. The method of claim 16, wherein deciphering the code associated with the at least one control signal comprises identifying a model of a component associated with the at least one control signal and identifying a command associated with the at least one control signal.

18. The method of claim 17, wherein determining whether the content element is being consumed by the user comprises determining whether the deciphered command is associated with displaying the content element on the display device.

19. The method of claim 16, further comprising:
   determining whether the content element is not being consumed for greater than a threshold time; and
   in response to determining that the content element is not being consumed for greater than the threshold time, stopping display of the content element on the display device.

20. The method of claim 17, further comprising maintaining a list of identified component models.

\* \* \* \* \*